United States Patent [19]

Pelzer

[11] Patent Number: 4,970,909

[45] Date of Patent: Nov. 20, 1990

[54] SOUND ATTENUATION IN WHEELS

[76] Inventor: Helmut Pelzer, Neue Strasse 5, D-5804 Herdecke-Ende, Fed. Rep. of Germany

[21] Appl. No.: 357,660

[22] Filed: May 25, 1989

Related U.S. Application Data

[62] Division of Ser. No. 181,363, Apr. 7, 1988, abandoned.

[30] Foreign Application Priority Data

Apr. 8, 1987 [DE] Fed. Rep. of Germany ....... 3711359

[51] Int. Cl.⁵ .............................................. F16H 55/14
[52] U.S. Cl. .............................. 74/443; 74/574; 295/7
[58] Field of Search ...................... 74/443, 574; 295/7; 301/6 WB; 464/180

[56] References Cited

U.S. PATENT DOCUMENTS

| | | | |
|---|---|---|---|
| 1,813,820 | 7/1931 | Ross | 295/7 |
| 1,852,538 | 4/1932 | Peterson | 74/443 |
| 2,605,132 | 7/1952 | Watter | 74/443 X |
| 3,057,220 | 10/1962 | Parr | 74/443 |
| 3,080,771 | 3/1963 | Baldwin | 295/7 X |
| 4,254,985 | 3/1981 | Kirschner | 74/443 X |
| 4,358,148 | 11/1982 | Kirschner | 74/443 X |

FOREIGN PATENT DOCUMENTS

| | | | |
|---|---|---|---|
| 50567 | 4/1983 | European Pat. Off. | 295/7 |
| 891951 | 10/1953 | Fed. Rep. of Germany | 74/443 |
| 445124 | 4/1936 | United Kingdom | 295/7 |
| 2086528 | 5/1982 | United Kingdom | 74/443 |

OTHER PUBLICATIONS

PTD Publication by Drago and Brown dtd 7/1979 titled "Why Gears Explode" pp. 77–81.

Primary Examiner—Allan D. Herrmann
Attorney, Agent, or Firm—Ralf H. Siegemund

[57] ABSTRACT

A device for attenuating sound in and of wheels, the wheel having a rim portion, a hub, and a web in between, there being a radially inwardly oriented flange surface, is improved by an attenuating layer on or in a groove of the flange surface, possibly with an extension against the web, and a cover, radially outwardly, and axially urging the attenuating layer upon the flange and the web.

2 Claims, 2 Drawing Sheets

SOUND ATTENUATION IN WHEELS

This is a divisional of co-pending application Ser. No. 181,363 filed on Apr. 7, 1988, now abandoned.

BACKGROUND OF THE INVENTION

The present invention relates to the attenuation of sound, being conducted either through the air or through solid material, for purposes of soundproofing wheels, particularly gears.

Gears upon engaging, even under very normal conditions of operation, are subjected to a so-called insertion or engagement impact; as the teeth engage there is an impact which stimulates vibrations, usually characteristic, natural vibrations, and in various modes.

These modes depend, of course, on the shape but also on the stiffness of the gear. The engagement, and, therefore, the stimulation depends on the configuration of the gearing. For example, in a typical case, a gear generally is comprised of the following separate elements; a hub, a gear disk, and gear rings, rims, or spurs.

The construction as outlined sets up a first resonance frequency at a mode which is equivalent to tilting the hub vis-a-vis the disk. The axis of rotation of the gear will then no longer be at right angles to the plane of the gear rim. This kind of oscillation produces primarily vibrations in the gear itself, and in solid parts being in physical connection therewith. This may be termed body sounds; sound generation in air is not very prevalent for this kind of mode.

In a second mode, the rim element or gear ring provides a periodic pumping motion in direction of the shaft, actually, in phase opposition but in two 90° offset directions. This results in a periodic bending of the disk as between two 90° offset ovals. Simultaneously, the hub is deformed, in accordance with two 90° offset ovals, but these oscillations are only 90° offset, so that in the case of a maximum deformation of the disks, in one direction, a maximum deformation of the hub in a 90° angle obtains.

This particular mode, actually, is more important because for some reason it involves more energy and, therefore, produces more severe noise on and in the rim. It should be realized that increasing the stiffness of the disk, from an overall point of view, does not reduce the oscillations but rather shifts them towards higher frequencies. Hence, it is and remains necessary to attenuate the amplitude of the oscillation, at whatever frequency it occurs, in order to provide for a suppression of this particular kind of oscillation. This mode is, moreover, primarily responsible for body sound but also for sound eminating into and propagating through air.

A third mode involves a pumping motion of the hub in direction of the shaft in that three actions are superimposed. There is a strong bending of the disk, a lifting and tilting of the hub, and a pumping of the gear ring. In fact, four nodes are established therewith. Again, this mode is important and significant for body sound as well as sound propagating in and through air.

One can see from the description above that upon energizing and exciting these several modes, generally one obtains axial oscillations as well as radial ones. German printed patent application No. 31 41 101 suggests to provide a cover on both sides of the disk of the gear and with a visco-elastic attenuation layer is interposed, in order to obtain attenuation of the vibration of the gear. The description of this particular publication, page 1, last paragraph, as continued on page 2, first paragraph, reveals that this particular attenuation is provided just to eliminate and attenuate axial oscillations, but not radial ones. This contention made in the reference is believed to be correct.

A publication by Drago and Brown in PTD, July, 1979, particularly page 80, last paragraph, and FIG. 6 on that same page, suggests so provide attenuating rings, for example, clamping rings with square-shaped cross-section to be placed into grooves which are formed in the rim of a wheel so that attenuation obtains by operation of the centrifugal motion of the ring. Thus, attenuation is strictly a matter of the mass involved.

DESCRIPTION OF THE INVENTION

It is an object of the present invention to provide a new and improved attenuation of vibrations and sound production in wheels and gears, particularly with emphasis on the attenuation of radial oscillation or vibration, but in cases radial as well as axial vibrations are to be suppressed.

In accordance with the preferred embodiment of the present invention, it is suggested to provide a layer for attenuation purposes of radial oscillations, preferably also of axial oscillation. In the case of wheels with recesses in the wheel disk, establishing a radial inwardly directed cylindrical flange surface, the attenuation of the radial oscillations obtains in that a visco-elastic material is forced radially into a groove in that cylindrical surface by means of a thin axially flat holding ring, serving as a cover and being in frictional contact with the groove. The sound attenuating material, as well as the ring, may have radial extensions such that the extended sound attenuating material is also axially urged against the wheel disk. Radial and/or radially patterned slots are provided in the gear wheel web. Cover and attenuating layer may be provided as a snap-in unit.

DESCRIPTION OF THE DRAWINGS

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

Proceeding now to the detailed description of the drawings, FIG. 1 illustrates a gear disk 1 with a rim gear portion 13, and a hub portion 8. Reference numeral 2 refers to a recess on one side, having a circular cylindrical surface 14. That surface is radially inwardly oriented surface of a flange or rim portion 1a, resulting from the recess 2.

FIG. 1, is now provided in addition with an annular groove which has an oblong radial cross-section. Grove 17 receives a sound insulating ring 15, being held in that groove by a steel ring 16, which projects radially inwardly from the groove 14. Here then, there is also a recess 12 provided.

FIG. 2 is, in fact, an enlarged rim portion of FIG. 1, but showing some modification and details. The groove 17 in this case, has a rounded bottom 18, and the ring 19 (corresponding to the ring 15) has a curved edge or rim 20. Better one should say that this is a semi-toroidal configuration which makes firm contact with a semi-toroidal bottom 18, to hold the ring 19 firmly in position. In this particular case, the clamped in ring 19 provides indeed sound attenuations.

FIG. 3 is a modification of the structure shown in FIG. 2, in that a rubber or rubber-elastic synthetic ring 23 is inserted in the space, defined on one hand, by the curved bottom 18 of the groove 17, and a circular cylindrical outer rim 21 of a clamping, holding, and positioning disk 22 which as clearly shown in the figure is axially flat and extends into the radial slitlike oblong groove 17 thereby providing flat contact with the sides of the slitlike groove 17.

Figure 1:
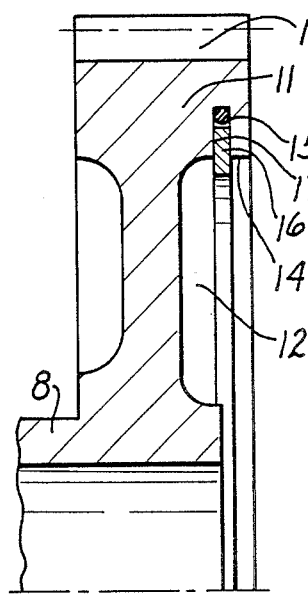
FIG. 1 is a radial cross-seciton through a gear improved with sound attenuations in accordance with the preferred embodiment of the present invention for practicing the best mode thereof.
Figure 2:
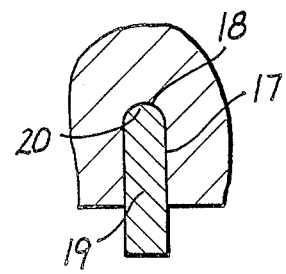
FIGS. 2 and 3 are enlarged sections through modifications of details in FIG. 1.
Figure 3:
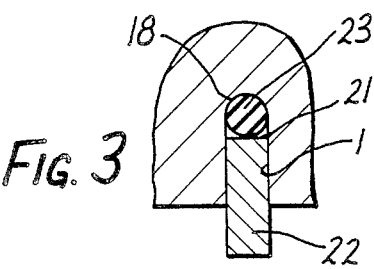

The particular examples shown in FIGS. 1, 2, and 3 show certain modifications, and have a significant advantage, as far as the requisite attenuation is concerned, and as compared with the particular device of the above-mentioned journal PTD. This advantage resides in the oblong configuration of the cross-section of the respective groove (14, 17), receiving a ring or two, but having a larger surface of abutment of the respective sound attenuating insertion in relation to the gear, so that oscillation is attenuated, for example, in FIG. 2 through friction between ring 19 and the gear flange 1a. The rings 16 and 22 in FIGS. 3 and 5, respectively, provide also such frictional attenuation, but here in addition to the sound attenuation as provided by the rubber elastic elements 15,23.

The invention has been explained above with reference to a configuration which is provided, on one side of the gear wheel. Of course, one can provide a structure also on the other side. Wheels which are split in a direction perpenticular to the axes, i.e. are made in effect from two parts, for example, wheels with arrow gears, have parts wherein the surface areas facing each other have complementary recesses so that together they provide a toroidal cavity with essentially rectangular cross-section and having its walls lined by visco-elastic attenuation layers, being retained therein by cover sheet of the kind mentioned above.

In all of these Figures and examples above, using particularly an attenuation layer and a clamping or holding strucute, it is advisable to provide for a dimension of the (radial) thickness such that the thickness values of the attenuated body of the attenuating layer and of the cover sheets have a ratio of 4:1:1.

Figure 4:
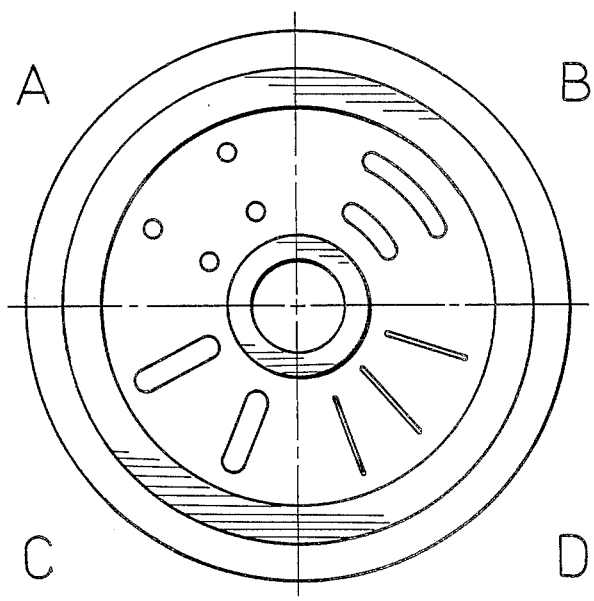
FIG. 4 is a composite representation of different slot patterns.

FIG. 4 illustrates in a composite fashion four sectors, actually showing four different patterns of possible recesses, perforations, apertures, holes, or the like, which may be provided in the respective gear wheel web.

In accordance with this approach of practicing the invention, the gear disk web, generally, is provided with axially penetrating perforations which have either a predominantly radial extension (C and D) or follow a radial pattern (A and B). The attenuation is provided in that these recesses are provided in the wheel disk and penetrate the disk web all the way. The penetrations and perforations are annular (B) or radial (C, D), or concentric segments (A, B) of narrow slots. These slots reduce sound radiation into air by providing, so to speak, an aerodynamic short-circuit, as between the front and the back.

In order to combine the various configurations explained above with others having attenuation and cover, it is suggested to provide attenuating layer and covers as separate elements which are assembled and superimposed, and together put into the desired position. FIGS. 8a, b, and c provide examples, showing and indicating that and how the combination of various other features is also possible.

The inventive attenuation has the advantage that wheels, gears, and the like of conventional manufacture, including the precision of such manufacture, reduces the sound emanation, while the cost of manufacture is reduced. The precision can be reduced without producing additional sound.

The invention is not limited to the embodiments described above, but all changes and modifications thereof, not constituting departures from the spirit and scope of the invention, are intended to be included.

I claim:

1. Device for attenuating sound in and of wheels, the wheel having a rim portion, there being a radially inwardly oriented flange surface, the improvement, the flange having a flat slitlike radially oblong annular groove extending radially outwardly and as a radially extending slit into said surface, attenuating ring means in a bottom of the groove, and a radially thin, axially flat holding ring means inserted in the slit for being radially outwardly urged onto the bottom of the groove, while being in axial flat friction contact with flat sides of the slitlike groove.

2. Device as in Claim 1, the attenuating ring means including a sound attenuating ring means being a rubber or rubber-elastic ring.

* * * * *